United States Patent [19]
Croix

[11] 3,883,665
[45] May 13, 1975

[54] FLUORINATED ISOPROPYL DERIVATIVES AS INHALATION ANESTHESIAS

[75] Inventor: Louise S. Croix, Summit, N.J.

[73] Assignee: Airco, Inc., New York, N.Y.

[22] Filed: Dec. 8, 1966

[21] Appl. No.: 600,011

[52] U.S. Cl. .............................................. 424/342
[51] Int. Cl. ............................................ A61k 27/00
[58] Field of Search ................ 167/52.6; 260/614 F; 424/342

[56] References Cited
UNITED STATES PATENTS

| | | | |
|---|---|---|---|
| 2,992,276 | 7/1961 | Weinmayr | 260/614 F |
| 3,216,897 | 11/1965 | Krantz | 167/52.6 |
| 3,346,448 | 10/1967 | Gilbert et al. | 167/52.6 |

*Primary Examiner*—Jerome D. Goldberg
*Attorney, Agent, or Firm*—Roger M. Rathbun; Edmund W. Bopp; H. Hume Mathews

[57] ABSTRACT

This invention relates to certain novel fluorinated isopropyl methyl ethers represented by the following formula:

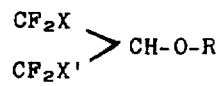

wherein X is chlorine or fluorine, X' is chlorine or fluorine, and R is $CH_3$ or $C_2H_5$. The compounds can be prepared by reacting the corresponding halogenated isopropyl alcohol with a lower alkyl sulfate or halide in the presence of an alkaline metal hydroxide. The compounds are useful as solvents or dispersants for fluorinated materials, and the compounds $(CF_3)_2CHOCH_3$, $CF_2CL(CF_3)CHOCH_3$, and $(CF_2Cl)_2CHOCH_3$, exhibit anesthetic properties in mammals.

4 Claims, No Drawings

FLUORINATED ISOPROPYL DERIVATIVES AS INHALATION ANESTHESIAS

This invention relates to new and useful halogenated isopropyl derivatives, more particularly fluorinated isopropyl ethers represented by the following formula

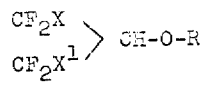

wherein X is chlorine or fluorine, $X^1$ is chlorine or fluorine, and R is $CH_3$ or $C_2H_5$.

Examples of these compounds are: methyl hexafluoroisopropyl ether $(CF_3)_2CHOCH_3$; ethyl hexafluoroisopropyl ether $(CF_3)_2CH-O-C_2H_5$; methyl 1-chloro-1,1,3,3,3-pentafluoroisopropyl ether $(CF_2Cl(CF_3)CHOCH_3$; and methyl 1,3-dichloro-1,1,3,3-tetrafluoroisopropyl ether $CF_2Cl(CF_2Cl)CHOCH_3$.

Preferably, these ethers may be prepared by reacting the fluorinated isopropyl alcohol with a lower alkyl sulfate or halide in the presence of an alkali metal hydroxide, as indicated by the reaction:

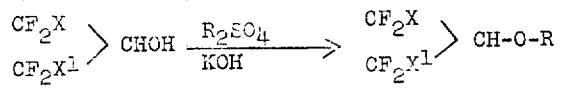

The starting fluorinated isopropyl alcohols may be prepared in various ways. A convenient method is the reduction of the corresponding ketone, such, for example, as by low pressure hydrogenation with Adams' catalyst; hydrogenation in the presence of palladium on carbon; reaction with isopropyl magnesium bromide (Grignard reaction); reaction with lithium aluminum hydride in ethyl ether or reaction with $NaBH_4$. The method using the reaction of the ketone with $NaBH_4$ is illustrated by the following equation:

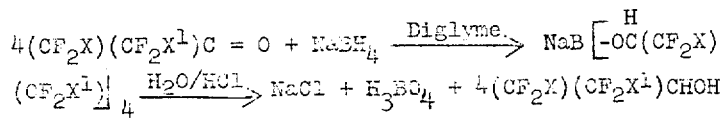

Using the above reaction hexafluoroisopropanol may be prepared as follows:

EXAMPLE 1

To a solution of 100 g. $NaBH_4$ in 1,200–1,400 ml. diethylene glycol dimethyl ether (water free) are added slowly with stirring 1510 g. of $(CF_3)_2C=O$. A suitable reaction vessel is a 3 liter flask provided with a paddle stirrer and a thermometer. The mixing is effected over a period of some 6 hours and the temperature is maintained at 40°C ± 5°C by cooling as necessary.

The resulting viscous reaction mixture is allowed to stand overnight, warmed slightly to reduce the viscosity and then poured into 220 ml. of concentrated HCl, 900 ml. of water, and 700 g. of ice. Following this drowning and acidification, the hexafluoroisopropyl alcohol layer is washed several times with acidified water and then dried over $MgSO_4$ to yield approximately 1.5 liter crude alcohol.

The crude product is distilled through a 36 inch × 1 inch packed column, using a 5/1 reflux ratio, care being taken to keep the take-off rate and overhead temperature low enough to minimize carry-over of the solvent. The recovered distillate is further purified by distillation from about one-half its volume of 85% $H_2SO_4$, thereby removing residual diglyme and dehydrating the desired alcohol. The yield is 70%.

By taking forecuts from the water layers, and recovering that absorbed by the $MgSO_4$, the yield of alcohol may be increased to about 90%.

Starting with

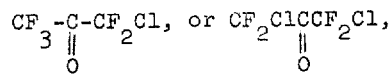

the corresponding alcohols

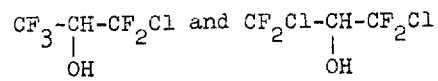

respectively may be prepared by the same procedure described above.

Using the fluoroisopropyl alcohols prepared as described above, the fluoroisopropyl ethers of the present invention may be prepared as described in the following examples in accordance with the etherification reaction previously referred to.

EXAMPLE 2

0.57 Mole of 1,1,1,3,3,3-hexafluoroisopropyl alcohol prepared as described in Example 1, is slowly added to a solution of 0.6 mole KOH in 125 ml. of water. 0.57 Mole of dimethyl sulfate is then added dropwise over a 30 min. period. Although the reaction is exothermic, heat is applied as necessary to maintain steady distillation of the product from the reaction mixture. The distillate, after drying over $MgSO_4$ is distilled to yield 0.32 mole of methyl 1,1,1,3,3,3-hexafluoroisopropyl ether $(CF_3)_2CH-O-CH_3$, b.p. 50°C, $n_D^{20}$ 1.27505.

The yield represents a 55.4% conversion of the isopropyl alcohol reactant.

EXAMPLE 3

41 Grams (0.62 mole) of KOH is dissolved in 150 ml. of water followed by the slow addition of 100 g. (0.59 mole) of 1,1,1,3,3,3-hexafluoroisopropyl alcohol and 150 g. (0.68 mole) of diethyl sulfate is added dropwise over a 40 min. period during which an exothermic reaction occurs. The reaction mixture is heated at reflux for 2 hr. The product is then separated by distillation, dried over $MgSO_4$ and distilled to yield 42.9 g. (0.22 mole) of ethyl 1,1,1,3,3,3-hexafluoroisopropyl ether $(CF_3)_2CHOCH_2CH_3$, b.p. 64.2°C, $n_D^{20}$ 1.28981, representing 36.9% conversion based on the starting alcohol.

EXAMPLE 4

31.7 Grams (0.5 mole) of potassium hydroxide is dissolved in 300 ml. water at 5°C, after which 92.3 g. (0.5 mole) of 1-chloro-1,1,3,3,3-pentafluoroisopropyl alcohol is added slowly, followed by the dropwise addition of 63.1 g. (0.5 mole) of dimethyl sulfate while maintaining the temperature of the reaction mixture below 10°C. The reaction mixture is then heated for ½ hr. at 45°–50°C. The lower organic layer is separated, washed with water, dried over $MgSO_4$ and distilled to yield 66.5 g. (0.33 mole) of methyl 1-chloro-1,1,3,3,3-pentafluoroisopropyl ether $CF_3(CF_2Cl)CHOCH_3$, b.p. 80°C, $n_D^{20}$ 1.32029, representing 67% conversion.

EXAMPLE 5

0.47 Mole of 1,3-dichloro-1,1,3,3-tetrafluoroisopropyl alcohol is reacted with 0.55 mole dimethyl sulfate by the procedure of Example 4. After working up in the manner of Example 4, there is obtained 0.20 mole of methyl 1,3-dichloro-1,1,3,3-tetrafluoroisopropyl ether $(CF_2Cl)_2CHOCH_3$, representing 43.5% conversion. The ether has a b.p. of 110°C, $n_D^{20}$ 1.36362.

This etherification reaction can be carried out, if desired, in a nonaqueous medium, in which event the salt of the alcohol may be prepared by reaction with metallic sodium or potassium in a hydrocarbon solvent such as benzene or toluene and methyl or ethyl bromide or iodide may be used instead of the dimethyl or diethyl sulfate.

These fluoroisopropyl ether products are water insoluble, inert liquids, easily miscible with other organic liquids, including fats and oils, and have a faintly ethereal odor. They readily dissolve fluorocarbons and fluorowaxes and may be used to prepare pastes or dispersions useful for coatings and the like, and may be used advantageously as degreasing agents. They are also useful as intermediates in the preparation of other halogenated compounds. For example, they may be dehydrohalogenated to give corresponding fluoroisopropenyl ethers by heating in a nonaqueous solvent medium such as mineral oil, cello-solve or an excess of the ether reactant, in the presence of KOH as the dehydrohalogenating agent.

The products of Examples 2, 4, and 5 exhibit anesthetic properties in mammals and are each capable of inducing anesthesia in laboratory animals when administered by inhalation in vapor form. Methyl hexafluoroisopropyl ether is nonflammable below 8% in oxygen or air. methyl 1,1,3,3-tetrafluoro-1,3-dichloroisopropyl ether and methyl 1,1,3,3,3-pentafluoroisopropyl ether are nonflammable. These agents therefore lend themselves to use as effective inhalant anesthetics with oxygen or respirable mixtures containing life supporting concentrations of oxygen enhanced by a greater protection against the hazard of ignition than characterized by other commonly used inhalant anesthetics.

Methyl 1,1,1,3,3,3-hexafluoroisopropyl ether, for example, was administered to test mice by a standard procedure in which a measured quantity of the agent is placed in a laboratory jar and allowed completely to evaporate to give a calculated vapor concentration. The test mice are then quickly placed in the jar and observed. In such tests the agent induced light anesthesia at 5% concentration and readily induced deep anesthesia of the mice in 30 seconds at 10% concentration. The anesthesia was deep, accompanied by adequate respiration and was followed by good recovery within 30 seconds after cessation of administration. In further tests on dogs, the agent was administered by inhalation in a semiclosed system. Administration was at the rate of 4.6 ml./kg./hr. (ml./kg. being ml. of the agent per kg. weight of the test animal). Induction occurred within 2 minutes and anesthesia was maintained for ½ hr. Following anesthesia, the dog manifested head-lift within 4 minutes and walked within 4.5 minutes. Respiration was slightly depressed and EKG blood pressure was normal during the anesthesia. In a test on another dog, 10 ml. of the agent were administered by the open drop method inducing anesthesia within 1.7 minutes. The dog recovered and was up within 7 minutes after induction. Similar results were obtained in closed-system administration.

Similar tests conducted with methyl 1,1,1,3,3-tetrafluoro-1,3-dichloroisopropyl ether revealed that this agent is several times more potent as an anesthetic than hexafluoroisopropyl methyl ether. For example, administering this agent to test mice in the same manner described above induced anesthesia in 2.35 minutes at a concentration of 0.94%. At 1.25% concentration the induction time was reduced to 1.37 minutes. The mice subjected to the lower concentration recovered within 2.25 minutes, while those subjected to the higher concentration recovered in 6.60 minutes. Light anesthesia was achieved at 0.625%. There were no delayed deaths and recoveries were uneventful. Recovery times were measured from the time the administration of the anesthetic containing atmosphere was discontinued by removing the mice from the test jar into room air.

Similar tests with methyl 1-chloro-1,1,3,3,3-pentafluoroisopropyl ether showed this agent effective to induce anesthesia in 2.45 minutes at 1.25% concentration; 1.25 minutes at 2.0; and 0.60 minutes at 3.5%.

It should be understood that the foregoing disclosure relates only to preferred embodiments of the invention and that it is intended to cover all changes and modifications of the examples of the invention herein chosen for the purposes of the disclosure, which do not constitute departures from the spirit and scope of the invention.

What is claimed is:

1. A respirable anesthetic composition comprising 1,1,1,3,3,3-hexafluoroisopropyl methyl ether, having the formula $(CF_3)_2CHOCH_3$ in admixture with a sufficient amount of oxygen to support life and in suitable proportions for the production of anesthesia.

2. a respirable anesthetic composition comprising 1,-1,3,3-tetrafluoro-1,3-dichloroisopropyl methyl ether having the formula $(CF_2Cl)_2CHOCH_3$ in admixture with a sufficient amount of oxygen to support life and in suitable proportions for the production of anesthesia.

3. The method of anesthetizing a warm blooded, mammal which comprises administering an effective amount of 1,1,1,3,3,3-hexafluoroisopropyl methyl ether as a general inhalation anesthetic to said mammal.

4. The method of anesthetizing a warm blooded, mammal which comprises administering an effective amount of 1,1,3,3-tetrafluoro-1,3-dichloroisopropyl methyl ether as a general inhalation anesthetic to said mammal.

* * * * *